United States Patent
Fleischer et al.

(10) Patent No.: US 10,049,061 B2
(45) Date of Patent: Aug. 14, 2018

(54) ACTIVE MEMORY DEVICE GATHER, SCATTER, AND FILTER

(71) Applicant: International Business Machines Corporation, Armonk, NY (US)

(72) Inventors: Bruce M. Fleischer, Bedford Hills, NY (US); Thomas W. Fox, Hopewell Junction, NY (US); Hans M. Jacobson, White Plains, NY (US); James A. Kahle, Austin, TX (US); Jaime H. Moreno, Dobbs Ferry, NY (US); Ravi Nair, Briarcliff Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 111 days.

(21) Appl. No.: 13/674,520

(22) Filed: Nov. 12, 2012

(65) Prior Publication Data

US 2014/0136811 A1    May 15, 2014

(51) Int. Cl.
*G06F 12/10*  (2016.01)
*G06F 13/28*  (2006.01)

(52) U.S. Cl.
CPC .............. *G06F 13/28* (2013.01); *Y02D 10/14* (2018.01)

(58) Field of Classification Search
None
See application file for complete search history.

(56) References Cited

U.S. PATENT DOCUMENTS

| | | | | |
|---|---|---|---|---|
| 5,537,606 A | * | 7/1996 | Byrne | .............. G06F 9/30109 711/169 |
| 6,105,075 A | * | 8/2000 | Ghaffari | ........................ 710/5 |

(Continued)

FOREIGN PATENT DOCUMENTS

| | | |
|---|---|---|
| CN | 101123113 | 2/2008 |
| CN | 101149714 A | 3/2008 |

(Continued)

OTHER PUBLICATIONS

Altera "Accelerating Functions with the C2H Compiler: Scatter-Gather DMA with Checksum," Jul. 2006, Version 1.1, Application Note 417, 11 pages.

(Continued)

*Primary Examiner* — Tracy Chan
(74) *Attorney, Agent, or Firm* — Cantor Colburn LLP (57) ABSTRACT

Embodiments relate to loading and storing of data. An aspect includes a method for transferring data in an active memory device that includes memory and a processing element. An instruction is fetched and decoded for execution by the processing element. Based on determining that the instruction is a gather instruction, the processing element determines a plurality of source addresses in the memory from which to gather data elements and a destination address in the memory. One or more gathered data elements are transferred from the source addresses to contiguous locations in the memory starting at the destination address. Based on determining that the instruction is a scatter instruction, a source address in the memory from which to read data elements at contiguous locations and one or more destination addresses in the memory to store the data elements at non-contiguous locations are determined, and the data elements are transferred.

14 Claims, 8 Drawing Sheets

(56) References Cited

U.S. PATENT DOCUMENTS

| | | | |
|---|---|---|---|
| 6,105,080 A * | 8/2000 | Holt et al. | 710/26 |
| 6,678,754 B1 * | 1/2004 | Soulier | 710/23 |
| 6,732,198 B1 * | 5/2004 | Johnson et al. | 710/22 |
| 6,754,732 B1 | 6/2004 | Dixon et al. | |
| 6,904,473 B1 * | 6/2005 | Bloxham | G06F 13/28 707/999.003 |
| 7,620,780 B1 | 11/2009 | Anderson | |
| 8,176,252 B1 | 5/2012 | Alexander et al. | |
| 8,397,013 B1 * | 3/2013 | Rosenband et al. | 711/103 |
| 2005/0033874 A1 * | 2/2005 | Futral et al. | 710/22 |
| 2005/0060714 A1 | 3/2005 | Jia et al. | |
| 2006/0143509 A1 * | 6/2006 | Okawa | 714/11 |
| 2007/0011398 A1 | 1/2007 | Van Niekerk | |
| 2007/0162643 A1 | 7/2007 | Tousek | |
| 2007/0162647 A1 * | 7/2007 | Tousek | 710/22 |
| 2008/0177909 A1 * | 7/2008 | Sapp | G06F 13/28 710/27 |
| 2009/0327532 A1 | 12/2009 | Jeddeloh | |
| 2011/0138155 A1 * | 6/2011 | Kawaguchi | G06F 9/30032 712/222 |
| 2011/0264858 A1 * | 10/2011 | Jeddeloh et al. | 711/114 |
| 2012/0254591 A1 * | 10/2012 | Hughes et al. | 712/205 |
| 2014/0040532 A1 * | 2/2014 | Watanabe et al. | 711/103 |

FOREIGN PATENT DOCUMENTS

| | | |
|---|---|---|
| CN | 101241478 | 8/2008 |
| CN | 101556565 | 10/2009 |
| CN | 101876948 | 11/2010 |
| CN | 102171649 | 8/2011 |
| CN | 102232215 A | 11/2011 |
| EP | 0589664 A1 | 3/1994 |
| WO | WO9934273 A2 | 7/1999 |

OTHER PUBLICATIONS

J. Groening, "Effect of Memory Access and Caching on High Performance Computing," 2010, 41 pages.

J. Carter, et al., "Memory System Support for Irregular Applications," Department of Computer Science, University of Utah, 1998, 10 pages.

CN Application No. 201310561131.2 First Office Action dated Feb. 26, 2016, 15 pages.

CN Application No. 201310561131.2 Second Office Action dated Oct. 20, 2016, 17 pages.

CN Application No. 2013105611312 First Search dated Feb. 18, 2016, 2 pages.

CN Application No. 2013105611312 Supplemental Search dated Oct. 12, 2016, 1 page.

* cited by examiner

ACTIVE MEMORY DEVICE GATHER, SCATTER, AND FILTER

BACKGROUND

The present invention relates generally to computer memory, and more particularly to transferring of data to/from memory in an active memory device.

Computer systems often require a considerable amount of high speed memory, such as random access memory (RAM), to hold information, such as data and programs, when a computer is powered and operational. Memory device demands have continued to grow as computer systems have increased performance and complexity.

Communication from a main processor to locations on memory devices can involve relatively long data access times and latency. The time it takes for the main processor to access memory can be, for example, several hundred cycles, including time to realize the data is not in cache (for memory reads), time to traverse from a processor core of the main processor to I/O, across a module or other packaging, arbitration time to establish a channel to memory in a multi-processor/shared memory system, and time to get the data into or out of a memory cell. When memory addresses of data values to be read or written are spread across various non-contiguous locations of memory further access time delays can be encountered, particularly if address translation is required for each access.

SUMMARY

Exemplary embodiments include a method for transferring data in an active memory device that includes memory and a processing element. An instruction is fetched and decoded for execution by the processing element. Based on determining that the instruction is a gather instruction, the processing element determines a plurality of source addresses in the memory from which to gather data elements and a destination address in the memory. One or more gathered data elements are transferred from the plurality of source addresses to contiguous locations in the memory starting at the destination address. Based on determining that the instruction is a scatter instruction, a source address in the memory from which to read a plurality of data elements at contiguous locations and one or more destination addresses in the memory to store the data elements at non-contiguous locations are determined. One or more of the data elements are transferred from the source address to the one or more destination addresses.

Additional exemplary embodiments include a processing element of an active memory device that includes a load store queue configured to interface with memory in the active memory device, an instruction buffer coupled to the load store queue and configured to receive an instruction, and a decoder coupled to the instruction buffer. The decoder is configured to decode the instruction and based on determining that the instruction is a gather instruction, the processing element is configured to determine a plurality of source addresses in the memory from which to gather data elements and a destination address in the memory. The processing element is further configured to transfer one or more gathered data elements from the plurality of source addresses to contiguous locations in the memory starting at the destination address. Based on determining that the instruction is a scatter instruction, a source address in the memory from which to read a plurality of data elements at contiguous locations and one or more destination addresses in the memory to store the data elements at non-contiguous locations are determined. One or more of the data elements are transferred from the source address to the one or more destination addresses.

Further exemplary embodiments include an active memory device including memory and a processing element configured to communicate with the memory. The processing element is configured to perform a method that includes fetching and decoding an instruction for execution by the processing element. Based on determining that the instruction is a gather instruction, the processing element determines a plurality of source addresses in the memory from which to gather data elements and a destination address in the memory. One or more gathered data elements are transferred from the plurality of source addresses to contiguous locations in the memory starting at the destination address. Based on determining that the instruction is a scatter instruction, a source address in the memory from which to read a plurality of data elements at contiguous locations and one or more destination addresses in the memory to store the data elements at non-contiguous locations are determined. One or more of the data elements are transferred from the source address to the one or more destination addresses.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

An embodiment is directed to gathering, storing, and filtering of data in an active memory device. The active memory device may be any suitable memory device including a plurality of memory elements (e.g., chips) connected to a logic portion and a processing element. In an embodiment, the active memory device includes layers of memory that form a three dimensional ("3D") memory device (e.g., a memory cube) where individual columns of chips form vaults in communication with the processing element and logic. The active memory device may include a plurality of processing elements configured to communicate to the chips and other processing elements. In an embodiment, a processing element accesses a selected address in a vault through an interconnect network. In addition, the interconnect network provides a communication path between processing elements on the active memory device as well as between processing elements and a main processor. Each vault may have an associated memory controller or logic unit that is also coupled to the interconnect network.

Embodiments include an active memory device that can perform a complex set of operations using multiple locations (e.g., data stored at specific addresses) within the active memory device as operands. Further, a process is provided whereby the instructions and operations are performed autonomously on these operands within the active memory device. Specifically, the instructions are stored within the active memory device itself and are not executed by a main processor. The stored instructions are provided to the processing elements for processing by the processing element in the active memory device. In one embodiment, the processing elements are programmable engines, including an instruction buffer, an instruction unit with branching capability and instruction decode, a mixture of vector, scalar, and mask register files, a plurality of load/store units for the movement of data between memory and the register files, and a plurality of execution units for the arithmetic and logical processing of various data types. Also included in the active memory device are address translation capabilities for converting virtual addresses to physical addresses, a unified Load/Store Queue to sequence data movement between the memory and the processing elements, and a processor communications unit, for communication with the main processor.

In an embodiment, the active memory device is configured to load configuration information or instructions from a part of the active memory device into a processing element following receiving a command from an external requestor, such as a main processor or another processing element. In addition, the processing element may perform virtual-to-real address translations that are computed while executing the loaded instructions. In an example, when performing a load instruction, the active memory device accesses an operand from a memory location and places the operand in a register in the processing element. A virtual address of the memory location is generated by the load instruction and is translated into a real address by the processing element. Similarly, when performing a store instruction, the active memory device writes a memory location with the contents (e.g., an operand) in a register in the processing element. A virtual address of the memory location is generated by the store instruction and is translated into a real address by the processing element.

Embodiments of the processing element in the active memory device also have the ability to read or to write operands in any part of the active memory device through the interconnect network. Specifically, a processing element may access other vaults in the active memory device using the interconnect network. In an embodiment, processing elements are pooled and coupled to the vaults via the interconnect network, where the processing elements are not physically located in the vault stack. In an embodiment, the interconnect network is a coupling device, such as a crossbar switch, configured to connect any processing element to any memory vault, provided the processing element and memory vault are coupled to the interconnect. In an embodiment, the interconnect network may couple a plurality of active memory devices, where the interconnect network provides a communication path between processing elements and memory vaults of separate devices.

In one embodiment, the processing element is included with the memory controller as part of the stack. In addition, the processing element may perform complex arithmetic and logic operations on the operands read and write end results back to locations in memory. The active memory device may return a single result value or signal to the main processor indicating that the results of the desired complex operation are ready in the active memory device, thus performing the high bandwidth processing on the active memory device and using a lower bandwidth communication between the active memory device and main processor.

The processing capabilities within an active memory device may reduce memory latency and energy consumption that would otherwise be experienced when memory is accessed by a processor residing in a separate chip. Instead of bringing data from memory to the separate processing chip through lower bandwidth communication paths, performing what is often quite simple calculations on the data, and then transferring the processed data back to memory, the main processor can configure the processing elements within the active memory device, and then instruct them to carry out the data processing tasks. This may be achieved by sending one or more commands from the main processor to the active memory device. In this scenario, the movement of data between the location where the data processing is performed and memory is greatly reduced, both in the distance it has to travel from the memory to the data processing location, and in the number of levels of cache traversed through a memory hierarchy.

In an embodiment, the active memory devices include stateless processing elements within a memory cube. Processing elements appear to a program in the main processor as long latency functional units. The processing elements themselves are programmable engines, comprising an instruction buffer, an instruction unit, including branching capability and instruction decode, a mixture of vector, scalar, and mask register files, a plurality of load/store units for the movement of data between memory and the register files, and a plurality of execution units for the arithmetic and logical processing of various data types. Also included are address translation capabilities for converting program virtual addresses to real addresses, a unified Load/Store Queue to sequence data movement between the memory and the processing elements, and a Processor Communications Unit, for communication with the main processor.

Figure 1:
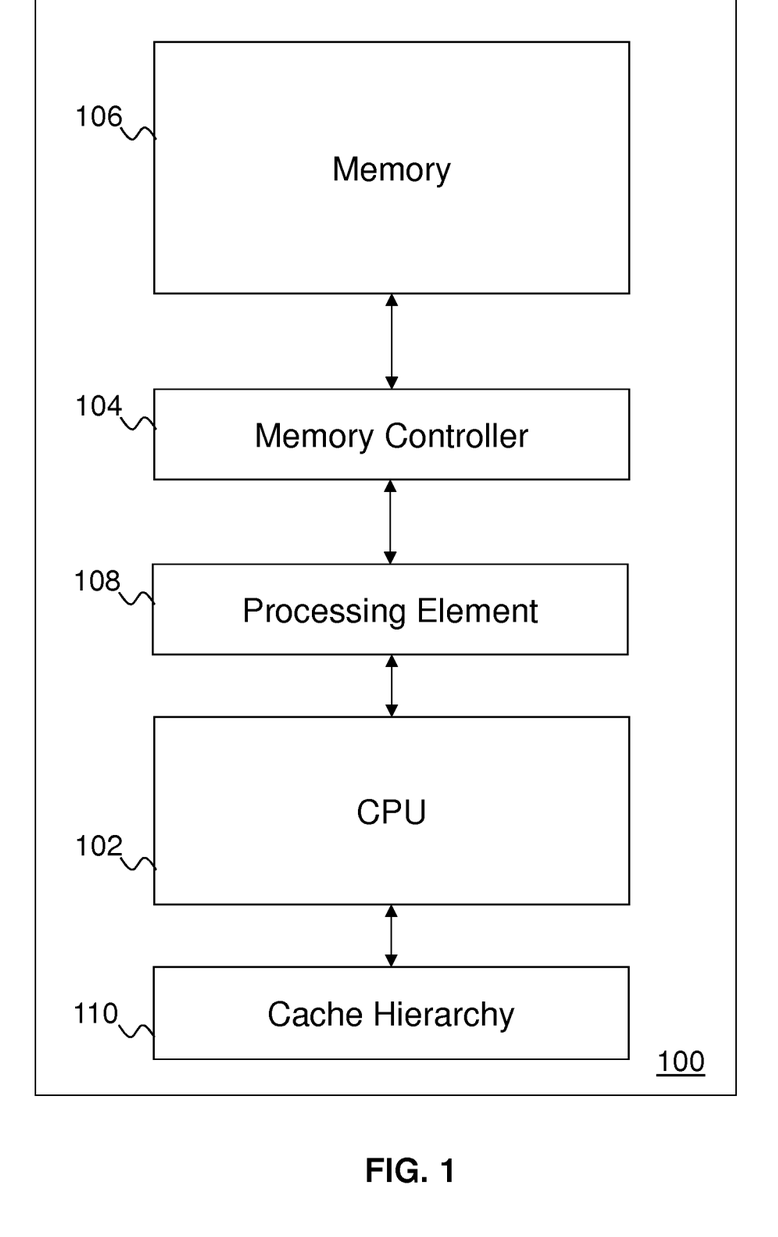
FIG. 1 illustrates a block diagram of a system for active memory in accordance with an embodiment.

FIG. 1 illustrates a block diagram of a system for storing and retrieving data in a memory in accordance with an embodiment. A system 100 depicted in FIG. 1 includes a computer processor (CPU) 102, a memory 106 having memory devices, as well as a memory controller 104 and processing element 108 for receiving and processing data from the computer processor 102 to be stored in the memory 106. The computer processor 102 may also interface to a cache hierarchy 110 that can include multiple levels of cache, where one or more levels of the cache hierarchy 110 may be included within the computer processor 102 and/or external to the computer processor 102.

The memory controller 104 may be in communication with the computer processor 102 and receive write requests from the computer processor 102 without using functions of the processing element 108. The write requests contain data to be written to the memory 106 and a virtual address for identifying the location in the memory 106 to which the data will be written. The memory controller 104 stores data at a real address within the memory 106. The computer processor 102 can map the virtual address to a real address in the memory 106 when storing or retrieving data.

In an embodiment, the processing element 108 is in communication with the computer processor 102 and receives a command from the computer processor 102. The command may correspond to instructions stored in the memory 106. The command may also include a virtual address for identifying the location in the memory 106 to which the data will be written. The memory controller 104 and/or processing element 108 stores data at a real address within the memory 106. In an embodiment, the processing element 108 maps the virtual address to a real address in the memory 106 when storing or retrieving data. The real address for a given logical address may change each time data in the memory 106 is modified. As described in further detail below, the computer processor 102 provides commands to the memory 106, where the processing element 108 receives the command and fetches corresponding instructions from the memory 106. The system 100 is one example of a configuration that may be utilized to perform the processing described herein. Although the system 100 has been depicted with only a single memory 106, memory controller 104, processing element 108 and computer processor 102, it will be understood that other embodiments would also operate in other systems with two or more of the memory 106, memory controller 104, processing element 108 or computer processor 102. In an embodiment, the memory 106, memory controller 104, processing element 108 and computer processor 102 are not located within the same computer. For example, the memory 106, processing element 108 and memory controller 104 may be located in one physical location (e.g., on a memory module) while the computer processor 102 is located in another physical location (e.g., the computer processor 102 accesses the memory controller 104 and/or processing element 108 via a network). In addition, portions of the processing described herein may span one or more of the memory 106, memory controller 104, processing element 108 and computer processor 102.

Figure 2:
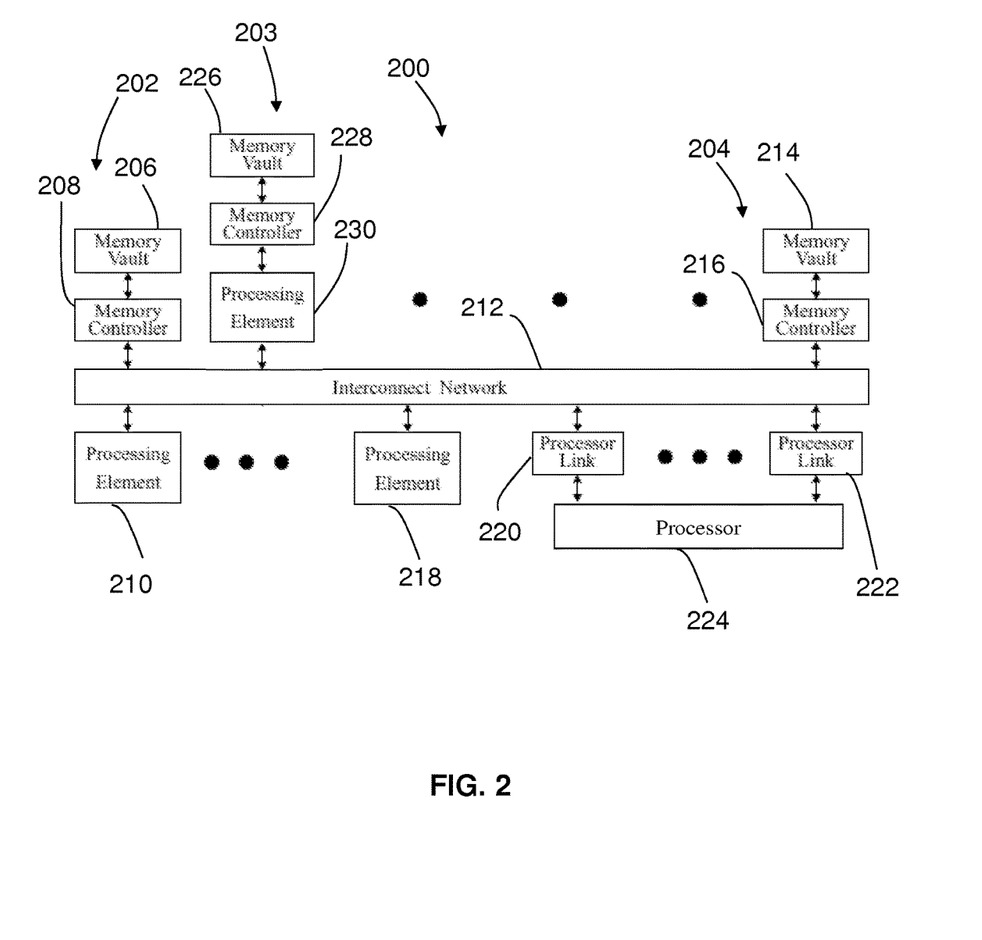
FIG. 2 illustrates a block diagram of a memory system with active memory in accordance with an embodiment.

FIG. 2 is a schematic diagram of an embodiment of a computer system 200 implementing active memory. In one embodiment, the computer system 200 includes an active memory device 202, an active memory device 203 and an active memory device 204. The active memory device 202 includes a memory vault 206, a memory controller 208 and a processing element 210. In an embodiment, the processing element 210, memory vault 206 and memory controller 208 are coupled and communicate via an interconnect network 212. Specifically, the processing element 210 communicates to the memory vault 206, memory controller 208 and other memory devices, such as active memory devices 203 and 204, via the interconnect network 212. The interconnect network 212 is also coupled to a main processor 224 by processor links 220 and 222. The interconnect network 212 provides a fast and high bandwidth path for communication between portions of the device, such as processing elements, memory controllers and memory, to provide improved performance and reduced latency for the active memory.

The active memory device 203 includes a memory vault 226, a memory controller 228 and a processing element 230. In an embodiment, the processing element 230, memory vault 226 and memory controller 228 are all located on the same side of the interconnect network 212, such as within a single stack. By positioning the processing element 230 in the same stack as memory vault 226, the latency is reduced when accessing locations in the memory vault 226, thus further improving performance. In one embodiment, the active memory 204 includes a memory vault 214 and memory controller 216 coupled to processing element 210 and processing element 218 via the interconnect network 212. As depicted, the processing element 218 is located on the other side of the interconnect network 212 from the memory controller 216 and memory vault 214. In embodiments, the active memory devices 202, 203 and 204 include multiple layers of stacked addressable memory elements. Further, the stack's memory may be divided into memory vaults 206, 226 and 214, or three-dimensional blocked regions of the memory device which share a common memory controller and/or memory element, and are capable of servicing memory access requests to their domain of memory independently of one another.

In embodiments, the processing elements, memory vaults and memory controllers may be arranged in a suitable manner depending on the application. For example, one or more processing elements, such as processing element 218, may be positioned on one side of the interconnect network 212 and may operate as a pool of processing elements that are available for accessing any memory in the memory system coupled to the interconnect network 212. The pooled processing elements are not limited to accessing a particular memory vault and, thus, one or more elements may be utilized upon receiving a command from the main processor 224. Accordingly, processing element 218 may be configured to access each memory vault 206, 226 and 214. In another embodiment, one or more processing element, such as processing element 230, is located as part of a stack including a memory vault 226 and memory controller 228. In such a configuration, the processing element 230 is configured to access memory vault 226 without going through the interconnect network 212. The processing element 230 is also coupled to the interconnect network 212 and can access memory vaults 206 and 214. In one embodiment, one or more processing element, such as processing element 210, is positioned on an opposite side of the interconnect network 212 from the memory vault 206 and memory controller 208. In the configuration, the processing element 210 is configured to access any memory coupled to the interconnect network 212, including memory vaults 226 and 214.

In an embodiment, the computer system may include a plurality of active memory devices, such as the active memory devices 202, 203 and 204. Further, each active memory device may include a plurality of stacks, each stack including a memory vault, memory controller and associated processing element. In one example, the number of processing elements may be greater than the number of memory vaults. In another embodiment, the memory devices may include fewer processing elements than memory vaults. In embodiments, the processing elements are pooled and available to access any memory in the system. For example, a memory device may include 16 memory vaults and memory controllers, but only eight processing elements. The eight processing elements are pooled, and utilized as resources for accessing any memory vaults coupled to the interconnect network. In another example, a memory device may be passive, where the device is controlled by processing elements of active memory devices coupled to the interconnect network.

Figure 3:
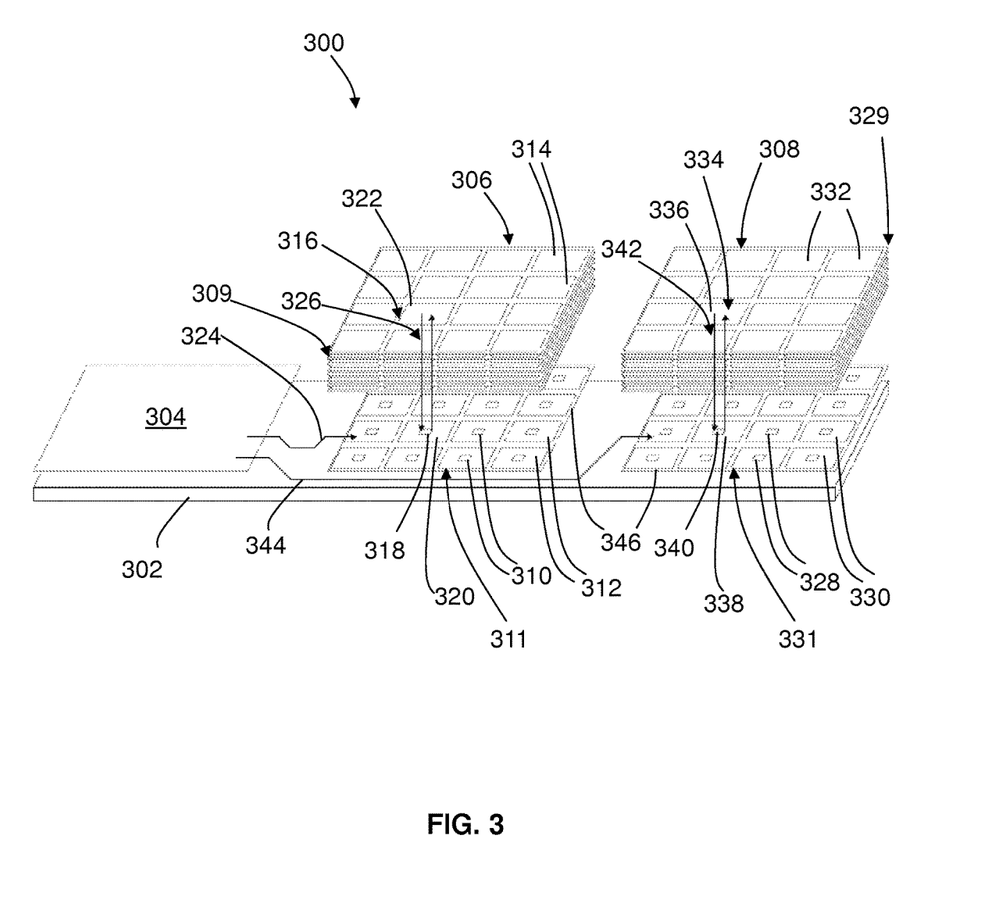
FIG. 3 illustrates a schematic diagram of a memory system with active memory in accordance with an embodiment.

FIG. 3 is a diagram of an exemplary computer system 300 implementing active memory. The computer system 300 includes a circuit board 302, a main processor 304, active memory device 306 and active memory device 308. The active memory device 306, active memory device 308 and main processor 304 are disposed on the circuit board 302. As depicted, portions of the active memory devices 306 and 308 are exploded to show details of the computer system 300 arrangement. The active memory devices 306 and 308 communicate to the main processor 304 via signal paths 324 and 344, respectively. As depicted, the active memory 306 device is arranged in layers, where a base layer 311 includes a plurality of memory controllers 310 and processing elements 312. For example, the active memory device 306 includes layers 309 of memory placed on top of the base layer 311, where the layers 309 each have a plurality of memory elements. As depicted, the base layer 311 also includes an interconnect network 346 to enable high bandwidth communication between memory, memory controllers and processing elements in the device.

In an embodiment, the active memory device 306 includes a plurality of memory vaults 314, where each memory vault 314 includes a memory element from each layer 309, the memory vaults 314 positioned adjacent to memory controllers 310 and processing elements 312. Specifically, the exemplary active memory device 306 includes layers of 16 memory elements, where the element layers form stacks, including a stack 316, where the stack 316 includes a memory vault 322 disposed above a memory controller 318 and a processing element 320. A high bandwidth communication path 326 provides a high bandwidth, direct and substantially reduced length (e.g., as compared to paths 324, 344) communication path between the processing element 320 and memory locations within the memory vault 322, thus reducing latency and power consumption for memory accesses. For example, the processing element 320 may receive a command from the main processor 304, load instructions from within the active memory device 306 based on the command, and, as part of the loaded instructions, access data at a location in the memory vault 314 and perform a complex operation on the data in the processing element 320. Further, the processing element 320 may also store data, such as the result, in the memory vault 314 and transmit a value or signal to the main processor 304 following execution of the command. In an embodiment, the processing element 320 stores or writes data (e.g. an operand) from a register in the processing element 320 to the memory vault 314. The processing element 320 is also configured to translate addresses from virtual-to-real and real-to-virtual as part of the read or store operations. Thus, the processing element 320 provides instruction loading, address translation, complex operations and other tasks local to the memory to reduce latency, save power and free up the main processor 304 to perform other tasks.

Similarly, the active memory device 308 includes a plurality of memory controllers 328 and processing elements 330 disposed on a base layer 331. In an embodiment, the active memory 308 includes layers 329 of memory devices placed on top of the base layer 331, where the layers 329 each have a plurality of memory devices. The base layer 331 also includes an interconnect network 346 to enable high bandwidth communication between memory and processing elements in the device. In an embodiment, the interconnect networks 346 of active memory device 306 and active memory device 308 are coupled and allow communication between processing elements and memory on separate devices.

In an embodiment, the active memory device 308 includes a plurality of memory vaults 332, where each memory vault 332 includes a memory element from each layer 309, the memory vaults 332 are positioned adjacent to memory controllers 328 and processing elements 330. The exemplary active memory device 308 includes 16 stacks, including stack 334, where the stack 334 includes a memory vault 336 disposed above a memory controller 340 and a processing element 338. A high bandwidth communication path 342 provides communication between the processing element 330 and memory locations within the memory vault 336.

Figure 4:
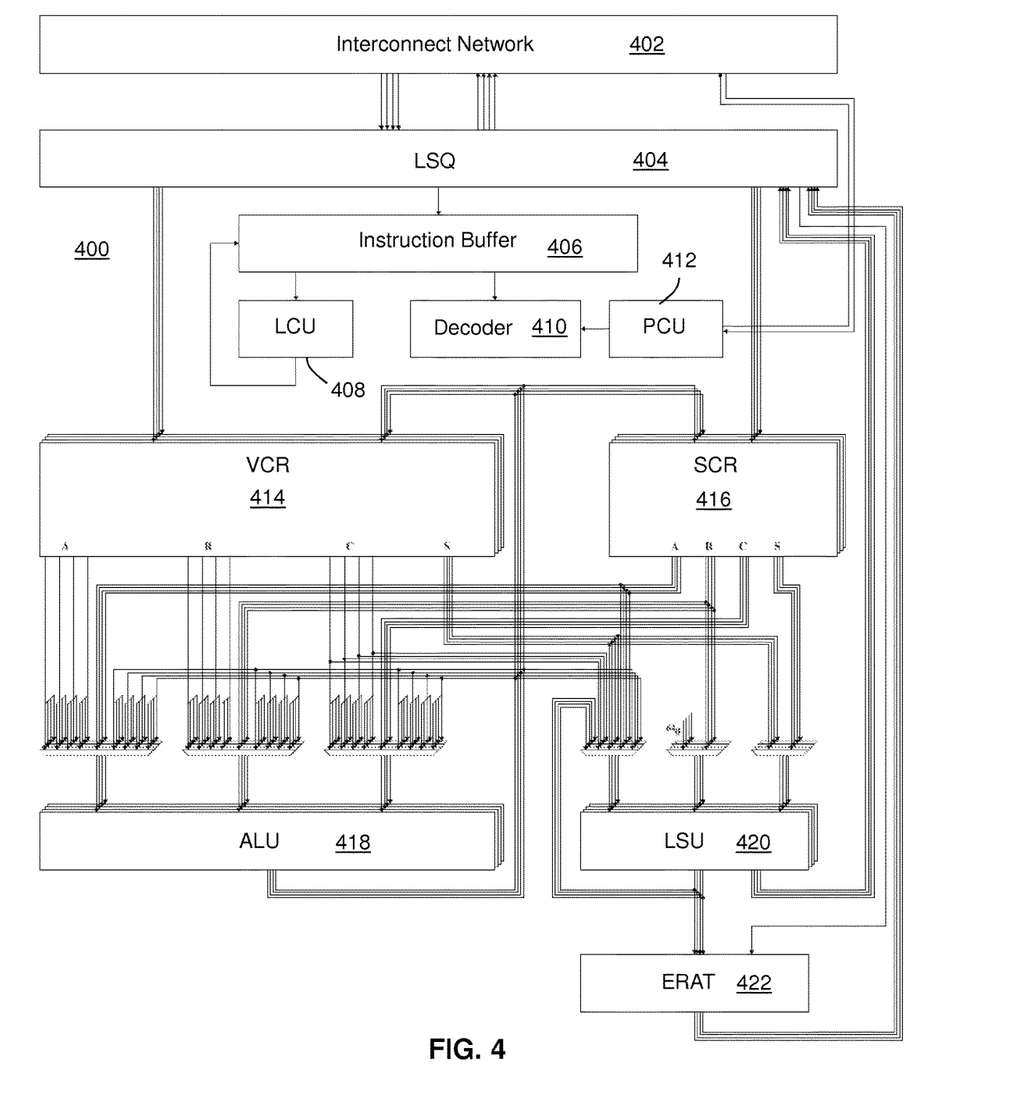
FIG. 4 illustrates a block diagram of a processing element in an active memory device in accordance with an embodiment.

FIG. 4 depicts an example of a processing element 400 coupled to an interconnect network 402 as an embodiment of one of the processing elements of FIGS. 1-3. The processing element 400 is a programmable vector processing element, situated in an active memory device, such as one of the active memory devices of FIGS. 1-3. In the example of FIG. 4, the processing element 400 includes a load-store queue (LSQ) 404 coupled to the interconnect network 402 and to an instruction buffer 406. The instruction buffer 406 is also coupled to a lane control unit (LCU) 408 and a decoder 410. A processor communication unit (PCU) 412 provides a communication interface between the processing element 400 and the main processor or other processing elements through the interconnect network 402. The LSQ 404 is also coupled to a vector computation register file (VCR) 414 and a scalar computation register file (SCR) 416. The VCR 414 and SCR 416 are coupled through multiple multiplexers to an arithmetic logic unit (ALU) 418 and a memory-access unit 420, also referred to as a load-store unit (LSU) 420. The ALU 418 is coupled to itself and to the LSU 420 through multiplexers, and is also coupled to the VCR 414 and the SCR 416. The LSU 420 may also be coupled to itself, to the LSQ 404, to an effective-to-real address translation unit (ERAT) 422, to the VCR 414 and to the SCR 416 (all connections not depicted). The ERAT 422 is also coupled to the LSQ 404. As will be appreciated, numerous other connections and elements can be included in the processing element 400. For example, connections between the decoder 410 and other elements are not depicted for clarity. Additionally, depicted connections in FIG. 4 can be modified or omitted, such as the depicted connection between decoder 410 and PCU 412.

The processing element 400 supports an instruction set architecture including a broad range of arithmetic capabilities on many data types. Vector processing capabilities of the processing element 400 allows for single instruction, multiple data (SIMD) in time, while SIMD in a spatial dimension is also supported. The instruction buffer 406 holds instructions (also referred to as "lane instructions"), which are fetched and executed in order, subject to branching. In an embodiment, each lane instruction contains 9 sub-instructions for execution in various units within the processing element 400. An iteration count may be included within the lane instruction, allowing the sub-instructions to be repeated up to a predetermined number of times (e.g., up to 32 times). This facilitates SIMD in time. The LCU 408 can manage the iteration count and determine when to advance to a next instruction or repeat execution of the same instruction. In an embodiment, arithmetic pipelines of ALU 418 are 64 bits wide, and spatial SIMD is supported by virtue of the ability to execute data types smaller than 64 bits in parallel, simultaneously as multiple execution slots. For example, assuming that a lane instruction includes 9 sub-instructions, execution of the sub-instructions can be performed in the LCU 408 for lane control, and in four processing slices, each of which includes an ALU 418 and an LSU 420. Pairs of the VCR 414 and the SCR 416 can be implemented per processing slice and are accessible by each pair of the ALU 418 and LSU 420. Accordingly, the VCR 414, SCR 416, ALU 418, LSU 420, and associated multiplexers are depicted as stacks of four elements to indicate 4 processing slices in the example of FIG. 4.

At the processing slice level, computation can occur on floating-point and fixed-point data types at, for example, a 64-bit granularity in a temporal SIMD manner on 64-bit vector elements, and in a temporal and spatial SIMD manner on narrower vector sub-elements, which can be 32-bits, 16-bits, or 8-bits wide.

Each processing slice within the processing element 400 includes a memory access pipeline (load/store pipeline) and an arithmetic pipeline. Managing flow through the LSU 420 as a load/store pipeline can enable computation of one address per vector data element or sub-element, and facilitates the gathering and scattering of data from and to memory. Gather/scatter capabilities provide access to data stored in non-contiguous memory locations by realizing multiple vector data element accesses simultaneously, despite their disjoint distribution in non-contiguous memory. The processing element 400 provides the ability to perform associated fixed-point effective address (i.e., virtual address) computations to support gather-scatter functionality. The arithmetic pipeline through the ALU 418 can include a robust assortment of floating-point and fixed-point operations to support a variety of workloads.

The LSU 420 may support load and store operations of, for example, 8, 4, 2 and 1 byte(s) and load and store operations of 4, 2, and 1 byte(s) to and from registers with packed data.

The ALU 418 may support copy operations between register files, arithmetic, rounding and conversion, comparison, and maximum and minimum operations on floating-point data types of double-precision (64 bits) and single-precision (32 bits), and arithmetic, rotate/shift, comparison, logical, count leading zeros, and ones population count operations on fixed-point data types of doubleword (64 bits), word (32 bits), halfword (16 bits) and bytes (8 bits).

In an embodiment, the computational model of a processing slice within the processing element 400 is a vector single instruction multiple data (SIMD) model with the VCR 414 and SCR 416. The VCR 414 can support multiple dimensions of registers, while the SCR 416 supports a single dimension of registers. For example, the VCR 414 can include 16 register entries with 32 elements each of 64 bits, and the SCR 416 can include 16 register entries with 1 element each of 64 bits, although numerous other configurations may be supported. A variable number of execution slots can be used, operating on an equal number of sub-elements, whereby the sub-elements taken together add up to one register element (either VCR 414 or SCR 416) of 64 bits in this example. The number of execution slots and the corresponding number of vector sub-elements depend upon the data type of the instruction. Examples of data types and sizes of various formats include: floating-point with double-precision (64-bit) and single-precision (32-bit) data types and fixed-point for a doubleword (64-bit), word (32-bit), halfword (16-bit), and byte (8-bit) data types.

Figure 5:
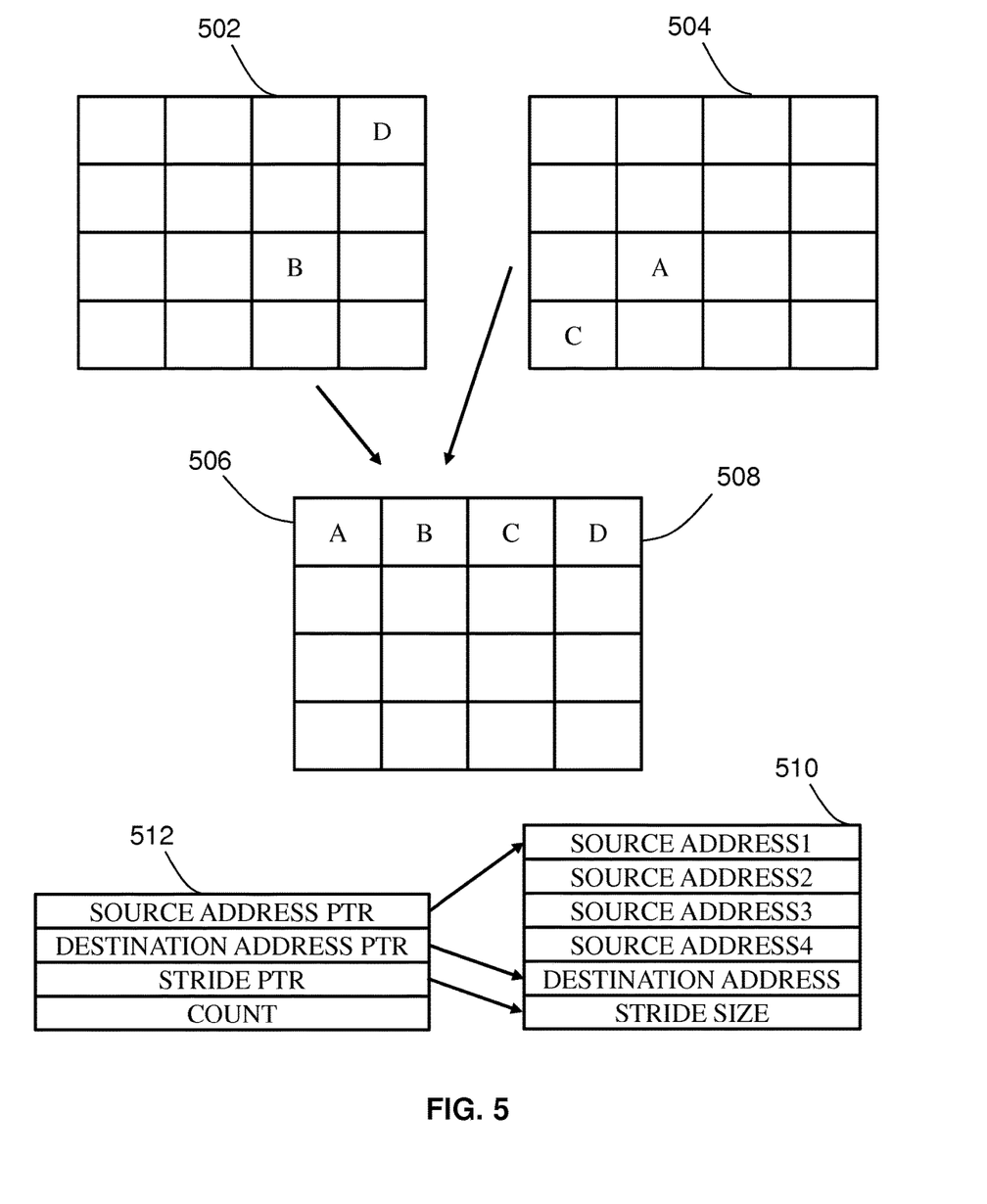
FIG. 5 illustrates an example of gathering scattered data in an active memory device in accordance with an embodiment.

FIG. 5 illustrates an example of gathering scattered data in an active memory device in accordance with an embodiment. A processing element, such as processing element 210 in FIG. 2, can receive a gather instruction from a main processor, such as main processor 224 of FIG. 2. Upon executing the gather instruction, the processing element gathers data elements from a set of memory locations and combines the data elements into a sequence of contiguous memory locations starting at a specified destination address. In the example of FIG. 5, data elements A, B, C, and D are located in noncontiguous memory locations, where data elements B and D are in memory vault 502 while data elements A and C are in memory vault 504. In response to the gather instruction, the processing element reads data elements A, B, C, and D from various locations in memory vaults 502 and 504 and writes data elements A, B, C, D into contiguous locations 506 in a memory region 508 that is accessible by the main processor which issued the gather instruction.

The main processor can provide a list 510 including a plurality of source addresses in memory from which to gather data elements, a destination address that identifies a memory starting address of the contiguous locations 506, and a stride size that indicates how much to increment the destination address for each of the gathered data elements from the source addresses. The stride size can be a single value for all gathered data elements or can be a vector to support different stride sizes associated with each of the source addresses. The list 510 may be sent directly to the processing element or placed into memory that is accessible by both the main processor and the processing element. The addresses in the list 510 may be specified in a virtual or effective address format, where the processing element then converts the effective address format into a real or physical address format using, for example, ERAT 422 of FIG. 4, to locate data elements requested by the main processor.

When the list 510 is not directly provided to the processing element, the gather instruction may include one or more pointers 512 that provide a more compact representation for the processing element to locate the list 510 or specific fields of the list 510 in memory. In the example of FIG. 5, the one or more pointers 512 include a source address pointer that points to source address1 in the list 510, a destination address pointer that points to the destination address in the list 510, a stride pointer that points to the stride size in the list 510, and a count to indicate a number of source addresses in the list 510. It will be understood that other formats can also be supported. For example, the one or more pointers 512 could simply point to the beginning of the list 510 and could optionally include the count. As a further alternative, the stride size could be omitted from the list 510 and stored in the one or more pointers 512 in place of the stride pointer. Address values in the one or more pointers 512 may be in an effective address format that is converted to a real address by the processing element to access the list 510.

Further with respect to FIG. 5, it will be understood that the gather instruction can access one or more memory chips in one or more memory vaults to support gathering of any number data elements using a single gather instruction. As will also be appreciated from FIG. 2, the main processor 224 can send gather instructions to multiple processing elements 210, 218, and 230 of FIG. 2 to perform simultaneous gathering across multiple memory vaults or multiple active memory devices without requiring knowledge of the real addresses of the various data elements by the main processor 224. The main processor 224 can read the values of data elements stored at the contiguous locations 506 and bring them into the cache hierarchy 110 of FIG. 1 for further processing. Since the data elements are stored at the contiguous locations 506, operations on the data can be performed using larger data width transactions, such as cache line transactions, rather than performing a series of narrower data width operations per data element.

Figure 6:
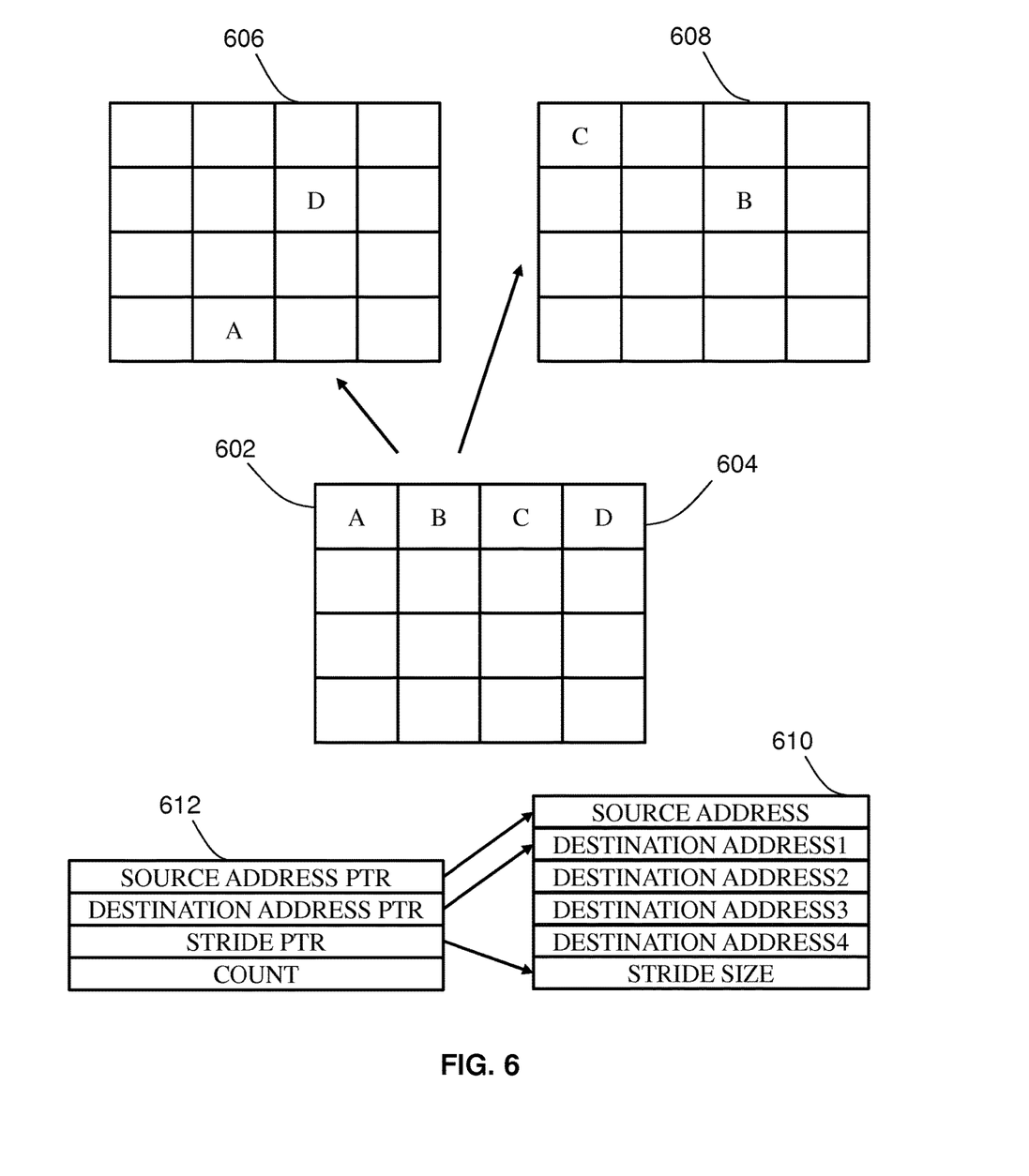
FIG. 6 illustrates an example of scattered storing of data in an active memory device in accordance with an embodiment.

FIG. 6 illustrates an example of scattered storing of data in an active memory device in accordance with an embodiment. Similar to the example of FIG. 5, a processing element, such as processing element 210 in FIG. 2, can receive a store instruction from a main processor, such as main processor 224 of FIG. 2. The store instruction can specify multiple non-contiguous locations for storing data elements, and as such is also referred to as a scatter instruction or a scatter store instruction. Upon executing the scatter instruction, the processing element reads data elements from contiguous memory locations starting at a specified source address from a set of memory locations and scatter writes the data elements to one or more non-contiguous memory locations identified in one or more destination addresses. In the example of FIG. 6, data elements A, B, C, and D are located in contiguous memory locations 602 in memory region 604. In response to the scatter instruction, the processing element reads data elements A, B, C, and D at contiguous memory locations 602 and writes the data elements A and D to various locations in memory vault 606 and writes data elements B and C to various locations in memory vault 608. In an exemplary embodiment, the contiguous memory locations 602 in memory region 604 are accessible by the main processor which issued the scatter instruction.

The main processor can provide a list 610 including a source address from which to read contiguous memory locations 602, a plurality of destination addresses that identify non-contiguous locations for writing the data elements, and a stride size that indicates how much to increment the source address for each of the data elements. The stride size can be a single value for all data elements or can be a vector to support different stride sizes associated with each source address increment. The list 610 may be sent directly to the processing element or placed into memory that is accessible by both the main processor and the processing element. The addresses in the list 610 may be specified in a virtual or effective address format, where the processing element then converts the effective address format into a real or physical address format using, for example, ERAT 422 of FIG. 4, to locate data elements requested by the main processor.

When the list 610 is not directly provided to the processing element, the scatter instruction may include one or more pointers 612 that provide a more compact representation for the processing element to locate the list 610 or specific fields of the list 610 in memory. In the example of FIG. 6, the one or more pointers 612 include a source address pointer that points to the source address in the list 610, a destination address pointer that points to the destination address1 in the list 610, a stride pointer that points to the stride size in the list 610, and a count to indicate a number of destination addresses in the list 610. It will be understood that other formats can also be supported. For example, the one or more pointers 612 could simply point to the beginning of the list 610 and could optionally include the count. As a further alternative, the stride size could be omitted from the list 610 and stored in the one or more pointers 612 in place of the stride pointer. Address values in the one or more pointers 612 may be in an effective address format that is converted to a real address by the processing element to access the list 610.

Further with respect to FIG. 6, it will be understood that the scatter instruction can access one or more memory chips in one or more memory vaults to support scatter storing of any number data elements using a single store instruction. As will also be appreciated from FIG. 2, the main processor 224 can send scatter instructions to multiple processing elements 210, 218, and 230 of FIG. 2 to perform simultaneous scatter storing across multiple memory vaults or multiple active memory devices without requiring knowledge of the real addresses of the various data elements by the main processor 224. The main processor 224 can write the values of data elements to the contiguous locations 602 from the cache hierarchy 110 of FIG. 1. Since the data elements are stored at the contiguous locations 602 operations on the data can be performed using larger data width transactions, such as cache line transactions, rather than performing a series of narrower data width operations per data element.

Figure 7:
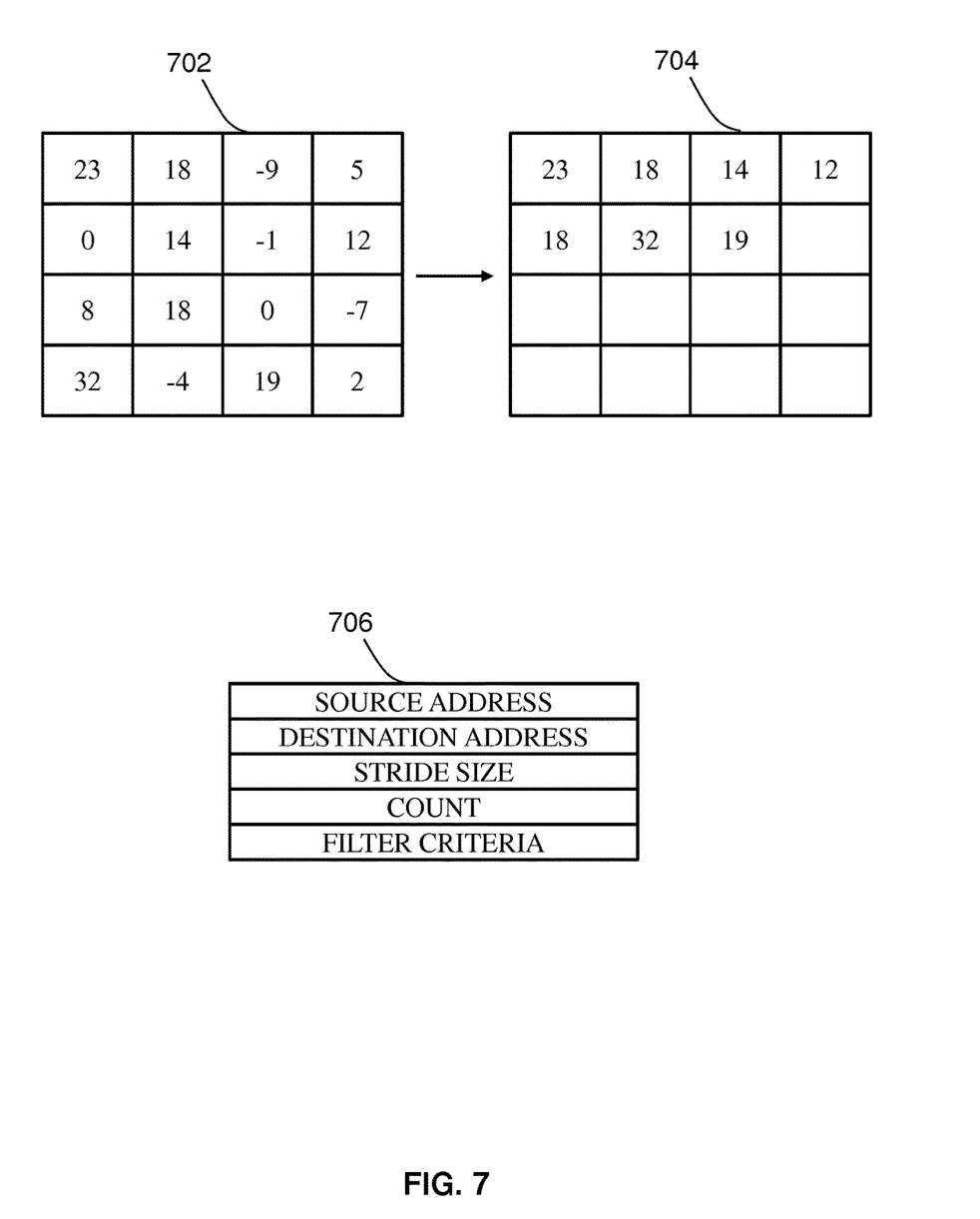
FIG. 7 illustrates an example of data filtering upon data transfer in an active memory device in accordance with an embodiment.

FIG. 7 illustrates an example of data filtering upon data transfer in an active memory device in accordance with an embodiment. Data transfers including transfers initiated using the gather instruction or the scatter instruction by a processing element, such as processing element 400 of FIG. 4, can include a filtering function incorporated into the instruction to limit storage of selected values. For example, when data values are read by the processing element 400 of FIG. 4 as part of a gather or scatter instruction, the ALU 418 and/or LSU 420 of FIG. 4 can apply filter criteria to prevent certain values from being stored. In the example of FIG. 7, data read at memory locations 702 are filtered before being stored to memory locations 704 according to a transfer instruction with filter criteria 706. The transfer instruction with filter criteria 706 can be formatted to indicate a source address, a stride size that indicates an amount to increment the source and destination addresses, and a count indicating a number of consecutive locations to examine and filter. The stride size can be a single value for all source and destination addresses or can be a vector to support different stride sizes associated with each of the addresses. The count in the transfer instruction with filter criteria 706 can be overwritten by the processing element to indicate a number of values stored at the destination address. The transfer instruction with filter criteria 706 can define the destination address and the filter criteria to apply. In the example of FIG. 7, the filter criteria are configured to transfer all values greater than ten (>10) from memory locations 702 to memory locations 704. Filter criteria may be defined as values to include or exclude from the transfer process.

Although only a single source and destination address are included in the example transfer instruction with filter criteria 706 of FIG. 7, it will be understood that multiple addresses can be included as part of the same instruction, such as the examples provided for gather and scatter instructions in FIGS. 5 and 6. The transfer instruction with filter criteria 706 allows a main processor to initiate a selective block transfer of data by a processing element using a single instruction. The main processor can further distribute workload by sending instances of the transfer instruction with filter criteria 706 to multiple processing elements, such as processing elements 210, 218, and 230 of FIG. 2 to perform simultaneous transferring and filtering across multiple memory vaults or multiple active memory devices.

Figure 8:
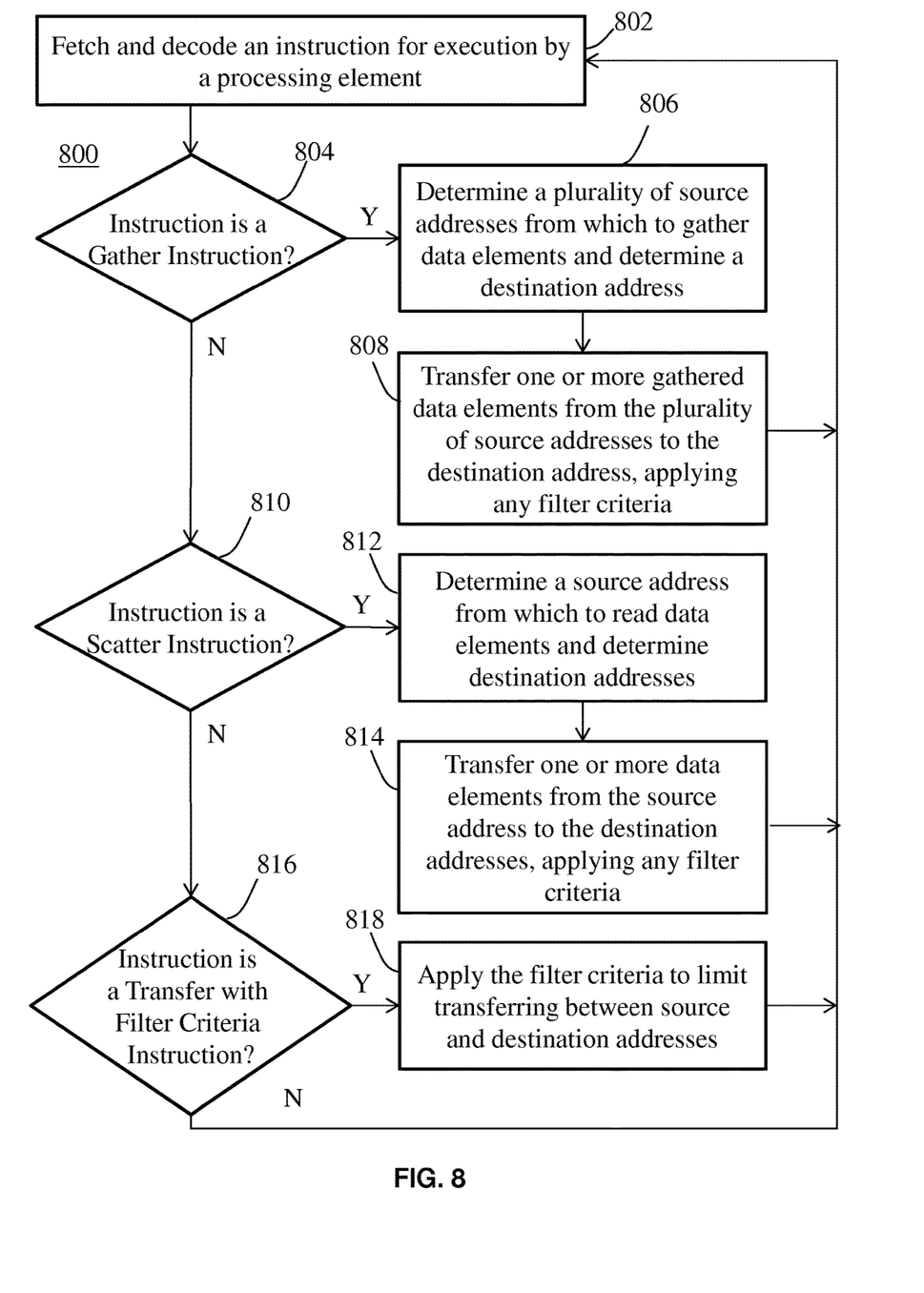
FIG. 8 illustrates a flow diagram of a process for gathering, scattering, and filtering of data in an active memory device in accordance with an embodiment.

FIG. 8 depicts an example process 800 for gathering, scattering, and filtering of data in an active memory device, such as the active memory devices of FIGS. 1-3. The blocks depicted in FIG. 8 may be performed by one of the processing elements of FIGS. 1-4 in an active memory device. For example, the blocks may be performed by a processing element in an active memory device, where the processing element accesses portions of memory (e.g., memory vaults sharing a stack with the processing element) and performs operations on data accessed from the memory. For purposes of explanation, the processing element is described in reference to processing element 400 of FIG. 4, where processing element 400 can be an embodiment of processing elements 210, 218, or 230 of FIG. 2. Although FIG. 8 is described relative to an active memory device, it will be understood that the process of FIG. 8 can be implemented in systems that include a processing element 400 in communication with memory in other configurations, such as memory located remotely from the processing element 400. Accordingly, the processing element 400 need not be located within an active memory device and can perform gather/scatter/filter operations on remotely located memory including, for example, memory located in a separate active memory device.

At block 802, processing element 400 fetches and decodes an instruction for execution by the processing element 400. The instruction may be fetched from the instruction buffer 406 and decoded by decoder 410 of FIG. 4.

At block 804, the processing element 400 determines whether the instruction is a gather instruction. At block 806, based on determining that the instruction is a gather instruction, the processing element 400 determines a plurality of source addresses in the memory from which to gather data elements, a stride size, and a destination address in the memory. At block 808, the processing element 400 transfers one or more gathered data elements from the plurality of source addresses to contiguous locations in the memory starting at the destination address, applying any filter criteria defined for the instruction.

The instruction, the plurality of source addresses, the destination address, and optional filter criteria can be provided by a main processor in communication with the processing element 400, such as main processor 224 of FIG. 2. The plurality of source addresses and the destination address can be received from the main processor in an effective address format and translated to a real address format by the processing element 400 using ERAT 422 of FIG. 4 when performing load and store operations to the memory. A source address pointer from the main processor can be used to identify a location in the memory containing the plurality of source addresses. Similarly, a destination address pointer from the main processor can be used to identify a location in the memory containing the destination address or the destination address can be provided directly. The plurality of source addresses identifies non-contiguous locations in the memory. The active memory device may be a three-dimensional memory cube, where the memory is divided into three-dimensional blocked regions as memory vaults, and the non-contiguous locations in the memory are accessed through one or more memory controllers in the active memory device.

At block 810, the processing element 400 determines whether the instruction is a scatter instruction. At block 812, based on determining that the instruction is a scatter instruction, the processing element 400 determines a source address in the memory from which to read a plurality of data elements at contiguous locations, a stride size, and one or more destination addresses in the memory to store the data elements at non-contiguous locations. At block 814, the processing element transfers one or more of the data elements from the source address to the one or more destination addresses, applying any filter criteria defined for the instruction.

At block 816, the processing element 400 determines whether the instruction is a transfer with filter criteria instruction other than a gather or scatter instruction. At block 818, the processing element 400 applies the filter criteria to limit transferring between the source and destination addresses according to the filter criteria. The process 800 continues to process further instructions from the instruction buffer 406.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for transferring data in an active memory device comprising a three-dimensional memory cube that includes memory divided into three-dimensional blocked regions as memory vaults, one or more memory controllers, and a processing element, the method comprising:

fetching and decoding an instruction for execution by the processing element of the active memory device; and based on determining that the instruction is a gather instruction comprising a first source address pointer, a first destination address pointer, a first stride pointer, and a first count, the processing element performing:

determining a plurality of source addresses in the memory from which to gather data elements based on the first source address pointer pointing to a list of the source addresses and the first count indicating a number of the source addresses in the list of the source addresses, the plurality of source addresses identifying non-contiguous locations in one or more of the memory vaults;

determining a destination address in the memory as pointed to by the first destination address pointer;

determining a first stride size vector as pointed to by the first stride pointer, wherein the first stride size vector supports different stride sizes associated with each of the source addresses;

accessing the non-contiguous locations in one or more of the memory vaults through the one or more memory controllers in the active memory device as gathered data elements by realizing multiple vector data element accesses simultaneously, wherein the memory vaults each comprise at least one data element from each of a plurality of memory layers; and transferring the gathered data elements from the plurality of source addresses to contiguous locations in the memory starting at the destination address and incrementing the destination address based on the first stride size vector as each of the gathered data elements is transferred; and based on determining that the instruction is a scatter instruction comprising a second source address pointer, a second destination address pointer, a second stride pointer, and a second count:

determining a source address in the memory from which to read a plurality of data elements at contiguous locations as pointed to by the second source address pointer;

determining a plurality of destination addresses in the memory to store the data elements at non-contiguous locations based on the second destination address pointer pointing to a list of the destination addresses and the second count indicating a number of the destination addresses in the list of the destination addresses;

determining a second stride size vector as pointed to by the second stride pointer, wherein the second stride size vector supports different stride sizes associated with the source address;

identifying filter criteria associated with the instruction; and transferring one or more of the data elements from the source address to the destination addresses while applying the filter criteria to limit transferring between the source and destination addresses according to the filter criteria based on a data value of the one or more of data elements to be transferred, wherein the filter criteria prevent one or more excluded data values from being stored at the destination addresses while continuing to store one or more included data values at the destination addresses and incrementing the source address based on the second stride size vector regardless of the filter criteria;

wherein the processing element provides virtual address computation functionality that supports an execution of the gather instruction or the scatter instruction.

2. The method of claim 1, wherein the instruction, the plurality of source addresses, and the destination address are provided by a main processor in communication with the processing element.

3. The method of claim 2, wherein the plurality of source addresses and the destination address are received from the main processor in an effective address format and are translated by the processing element to a real address format when performing load and store operations to the memory.

4. The method of claim 2, wherein determining the plurality of source addresses in the memory from which to gather data elements further comprises receiving the first source address pointer from the main processor that identifies a location in the memory containing the plurality of source addresses.

5. The method of claim 1, wherein the active memory device further comprises multiple instances of the processing element coupled to an interconnect network, the multiple instances of the processing element operable to access any of the memory vaults across the interconnect network.

6. A processing element of an active memory device comprising a three-dimensional memory cube that includes memory divided into three-dimensional blocked regions as memory vaults, one or more memory controllers, and the processing element, comprising:

a load store queue that interfaces with one or more of the memory vaults in the active memory device;

an instruction buffer coupled to the load store queue; and a decoder coupled to the instruction buffer, the decoder decodes an instruction received at the instruction buffer and based on determining that the instruction is a gather instruction comprising a first source address pointer, a first destination address pointer, a first stride pointer, and a first count, the processing element performs:

determining a plurality of source addresses in the memory from which to gather data elements based on the first source address pointer pointing to a list of the source addresses and the first count indicating a number of the source addresses in the list of the source addresses, the plurality of source addresses identifying non-contiguous locations in one or more of the memory vaults;

determining a destination address in the memory as pointed to by the first destination address pointer;

determining a first stride size vector as pointed to by the first stride pointer, wherein the first stride size vector supports different stride sizes associated with each of the source addresses;

accessing the non-contiguous locations in one or more of the memory vaults through the one or more memory controllers in the active memory device as gathered data elements by realizing multiple vector data element accesses simultaneously, wherein the memory vaults each comprise at least one data element from each of a plurality of memory layers; and transferring the gathered data elements from the plurality of source addresses to contiguous locations in the memory starting at the destination address and incrementing the destination address based on the first stride size vector as each of the gathered data elements is transferred; and based on determining that the instruction is a scatter instruction comprising a second source address pointer, a second destination address pointer, a second stride pointer, and a second count:

determining a source address in the memory from which to read a plurality of data elements at contiguous locations as pointed to by the second source address pointer;

determining a plurality of destination addresses in the memory to store the data elements at non-contiguous locations based on the second destination address pointer pointing to a list of the destination addresses and the second count indicating a number of the destination addresses in the list of the destination addresses;

determining a second stride size vector as pointed to by the second stride pointer, wherein the second stride size vector supports different stride sizes associated with the source address;

identifying filter criteria associated with the instruction; and transferring one or more of the data elements from the source address to the destination addresses while applying the filter criteria to limit transferring between the source and destination addresses according to the filter criteria based on a data value of the one or more of data elements to be transferred, wherein the filter criteria prevent one or more excluded data values from being stored at the destination addresses while continuing to store one or more included data values at the destination addresses and incrementing the source address based on the second stride size vector regardless of the filter criteria;

wherein the processing element provides virtual address computation functionality that supports an execution of the gather instruction or the scatter instruction.

7. The processing element of claim 6, wherein the instruction, the plurality of source addresses, and the destination address are provided by a main processor in communication with the processing element.

8. The processing element of claim 7, further comprising an effective-to-real address translation unit, wherein the plurality of source addresses and the destination address are received from the main processor in an effective address format and are translated by the effective-to-real address translation unit to a real address format.

9. The processing element of claim 7, wherein determining the plurality of source addresses in the memory from which to gather data elements further comprises receiving the first source address pointer from the main processor that identifies a location in the memory containing the plurality of source addresses.

10. An active memory device that is a three-dimensional memory cube comprising:

memory divided into three-dimensional blocked regions as memory vaults;

one or more memory controllers; and a processing element that communicates with the memory, the processing element performs a method comprising:

fetching and decoding an instruction for execution by the processing element; and based on determining that the instruction is a gather instruction comprising a first source address pointer, a first destination address pointer, a first stride pointer, and a first count, the processing element performing:

determining a plurality of source addresses in the memory from which to gather data elements based on the first source address pointer pointing to a list of the source addresses and the first count indicating a number of the source addresses in the list of the source addresses, the plurality of source addresses identifying non-contiguous locations in one or more of the memory vaults;

determining a destination address in the memory as pointed to by the first destination address pointer;

determining a first stride size vector as pointed to by the first stride size pointer, wherein the first stride size vector supports different stride sizes associated with each of the source addresses;

accessing the non-contiguous locations in one or more of the memory vaults through the one or more memory controllers in the active memory device as gathered data elements by realizing multiple vector data element accesses simultaneously, wherein the memory vaults each comprise at least one data element from each of a plurality of memory layers; and transferring the gathered data elements from the plurality of source addresses to contiguous locations in the memory starting at the destination address and incrementing the destination address based on the first stride size vector as each of the gathered data elements is transferred; and based on determining that the instruction is a scatter instruction comprising a second source address pointer, a second destination address pointer, a second stride pointer, and a second count:

determining a source address in the memory from which to read a plurality of data elements at contiguous locations as pointed to by the second source address pointer;

determining a plurality of destination addresses in the memory to store the data elements at non-contiguous locations based on the second destination address pointer pointing to a list of the destination addresses and the second count indicating a number of the destination addresses in the list of the destination addresses;

determining a second stride size vector as pointed to by the second stride pointer, wherein the second stride size vector supports different stride sizes associated with the source address;

identifying filter criteria associated with the instruction; and transferring one or more of the data elements from the source address to the destination addresses while applying the filter criteria to limit transferring between the source and destination addresses according to the filter criteria based on a data value of the one or more of data elements to be transferred, wherein the filter criteria prevent one or more excluded data values from being stored at the destination addresses while continuing to store one or more included data values at the destination addresses and incrementing the source address based on the second stride size vector regardless of the filter criteria;

wherein the processing element provides virtual address computation functionality that supports an execution of the gather instruction or the scatter instruction.

11. The active memory device of claim 10, wherein the instruction, the plurality of source addresses, and the destination address are provided by a main processor in communication with the processing element.

12. The active memory device of claim 11, wherein the plurality of source addresses and the destination address are received from the main processor in an effective address format and are translated by the processing element to a real address format when performing load and store operations to the memory.

13. The active memory device of claim 11, wherein determining the plurality of source addresses in the memory from which to gather data elements further comprises receiving the first source address pointer from the main processor that identifies a location in the memory containing the plurality of source addresses.

14. The active memory device of claim 10, further comprising multiple instances of the processing element coupled to an interconnect network, the multiple instances of the processing element operable to access any of the memory vaults across the interconnect network.

* * * * *